(12) United States Patent
Chiu et al.

(10) Patent No.: US 8,548,388 B2
(45) Date of Patent: Oct. 1, 2013

(54) METHOD OF REDUCING SPECIFIC ABSOPTION RATE FOR AN ELECTRONIC DEVICE, AND THE ELECTRONIC DEVICE

(75) Inventors: Chieh-Ping Chiu, Erlun Township, Yunlin County (TW); Feng-Jen Weng, Tao Yuan Hsien (TW); Hsiao-Wei Wu, Zhongli (TW); I-Ping Yen, New Taipei (TW)

(73) Assignee: Quanta Computer Inc., Tao Yuan Hsien, Taiwan (CN)

( * ) Notice: Subject to any disclaimer, the term of this patent is extended or adjusted under 35 U.S.C. 154(b) by 204 days.

(21) Appl. No.: 13/166,111

(22) Filed: Jun. 22, 2011

(65) Prior Publication Data

US 2012/0157001 A1   Jun. 21, 2012

(30) Foreign Application Priority Data

Dec. 16, 2010   (TW) ................. 99144205 A

(51) Int. Cl.
*H04B 17/00*   (2006.01)

(52) U.S. Cl.
USPC ......... 455/67.11; 455/77; 455/90.2; 343/700; 343/703

(58) Field of Classification Search
USPC ................. 455/67.11, 77, 90.2, 550.1, 562.1, 455/575.7; 343/700, 703, 724, 751
See application file for complete search history.

(56) References Cited

U.S. PATENT DOCUMENTS

| | | | |
|---|---|---|---|
| 6,919,845 B2 * | 7/2005 | Ozaki et al. | 343/703 |
| 7,268,564 B2 * | 9/2007 | Ozaki et al. | 324/632 |
| 2010/0295743 A1 * | 11/2010 | Pu et al. | 343/749 |

* cited by examiner

*Primary Examiner* — Tuan H Nguyen
(74) *Attorney, Agent, or Firm* — Nixon & Vanderhye P.C.

(57) ABSTRACT

An electronic device includes a radio frequency module having a communication port, and an antenna module having a number of antennas electrically coupled to the communication port. A method of reducing specific absorption rate (SAR) for the electronic device includes: a) measuring the SAR for the electronic device to obtain a measurement result; b) increasing the number of antennas of the antenna module when the measurement result is not lower than a standard value; and c) repeating steps a) and b) until the measurement result is equal to or smaller than the standard value.

6 Claims, 7 Drawing Sheets

ANTENNA 12a,12b_PCS 1880MHz
EFFICIENCY= -1.9dB, GAIN= 2.7 dBi @ (45, 90)

H PLANE(X-Y PLANE, θ = 90)

Peak Value = 1.7 dBi, Average = -1.8

E1 PLANE (Z-X PLANE, φ = 0)

Peak Value= -0.7dBi, Average= -2.9dBi.

E2 PLANE (Z-Y PLANE, φ = 90)

Peak Value = 2.7 dBi, Average = -1.8 dBi.

SAR=2.5(mW/g)

SAR=0.58(mW/g)    SAR=0.79(mW/g)

METHOD OF REDUCING SPECIFIC ABSOPTION RATE FOR AN ELECTRONIC DEVICE, AND THE ELECTRONIC DEVICE

CROSS-REFERENCE TO RELATED APPLICATION

This application claims priority of Taiwanese Application No. 099144205 filed on Dec. 16, 2010.

BACKGROUND OF THE INVENTION

1. Field of the Invention

The present invention relates to a method of reducing specific absorption rate (SAR) for an electronic device, more particularly to a method involving distributing transmission power among antennas of the electronic device so as to reduce SAP for the electronic device.

2. Description of the Related Art

It is known that long term exposure to electromagnetic field can harm the human body. The Federal Communications Commission (FCC) established a safety standard for limiting specific absorption rate (SAR) for handheld electronic devices, in which the SAR should be lower than 1.6 (mW/g) Manufacturers usually reduce power of the electronic devices to meet the FCC requirement. However, power reduction of the electronic device may also decrease efficiency of the electronic device.

SUMMARY OF THE INVENTION

Therefore, the object of the present invention is to provide a method of reducing specific absorption rate (SAR) for an electronic device. The electronic device includes a radio frequency module having a communication port, and an antenna module having a number of antennas electrically coupled to the communication port.

Accordingly to an aspect of the present invention, the method of this invention comprises the steps of:

a) measuring the SAr for the electronic device to obtain a measurement result;

b) increasing the number of antennas of the antenna module when the measurement result is not lower than a standard value; and c) repeating steps a) and b) until the measurement result is equal to or smaller than the standard value.

According to another aspect of the present invention, the electronic device includes a radio frequency module having a communication port, an antenna module having a number of antennas electrically coupled to the communication port, and a power density distribution network electrically coupled between the communication port and the antennas. The method of this invention comprises the steps of:

a) measuring the SAR for the electronic device to obtain a measurement result;

b) increasing the number of antennas of the antenna module and configuring the power density distribution network for distributing transmission power among the antennas when the measurement result is not lower than a standard value; and c) repeating steps a) and b) until the measurement result is equal to or smaller than the standard value.

Another object of the present invention is to provide an electronic device associated with a low specific absorption rate.

According to yet another aspect of the present invention, an electronic device comprises:

a radio frequency module having a communication port;

an antenna module having a number of antennas electrically coupled to the communication port; and a power density distribution network electrically coupled between the communication port and the antennas and configured for distributing transmission power among the antennas such that a specific absorption rate for the electronic device is equal to or smaller than a standard value.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
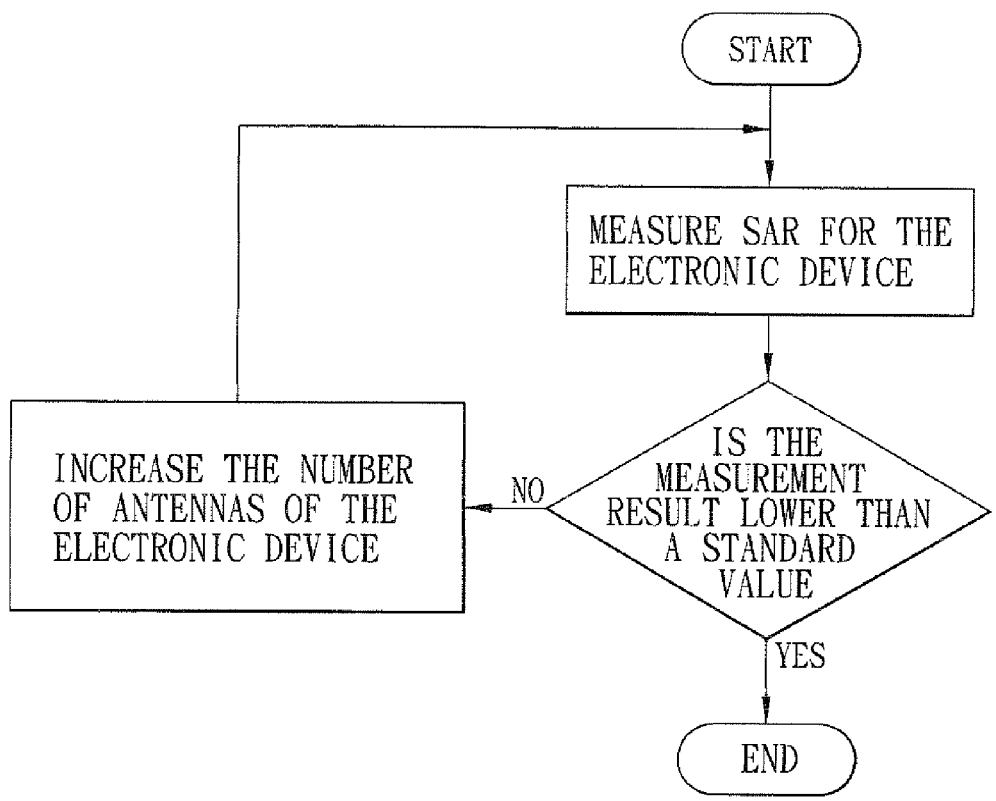
FIG. 1 is a flow chart of a method of reducing specific absorption rate (SAR) for an electronic device according to a preferred embodiment of the present invention.
Figure 2:
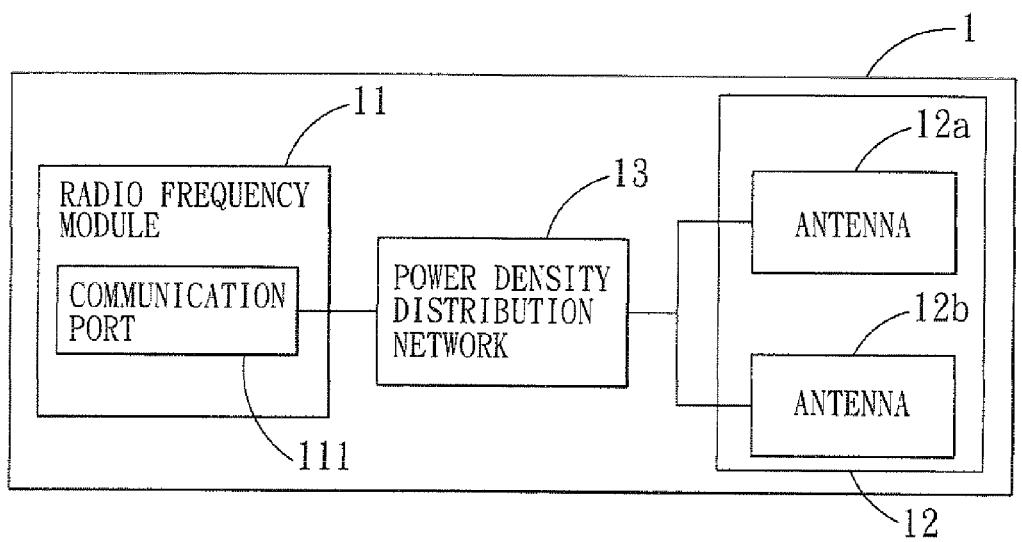
FIG. 2 is a block diagram of the electronic device illustrating an arrangement with two antennas.

Referring to FIGS. 1 and 2, a preferred embodiment of a method of reducing specific absorption rate (SAR) for an electronic device according to the present is shown. The electronic device 1 includes a radio frequency module 11 having a communication port 111, an antenna module 12 having a number of antennas 12*a*, 12*b* electrically coupled to the communication port 111, and a power density distribution network 13 electrically coupled between the communication port 111 and the antennas 12*a*, 12*b*.

Figure 8:
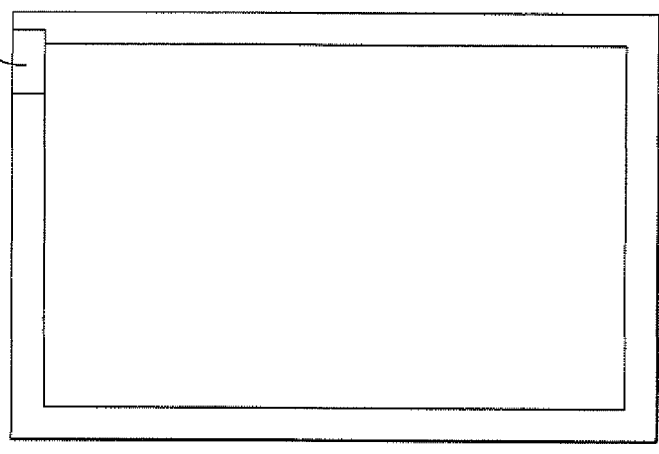
FIG. 8 is a schematic view illustrating SAR value for one antenna of the electronic device.
Figure 9:
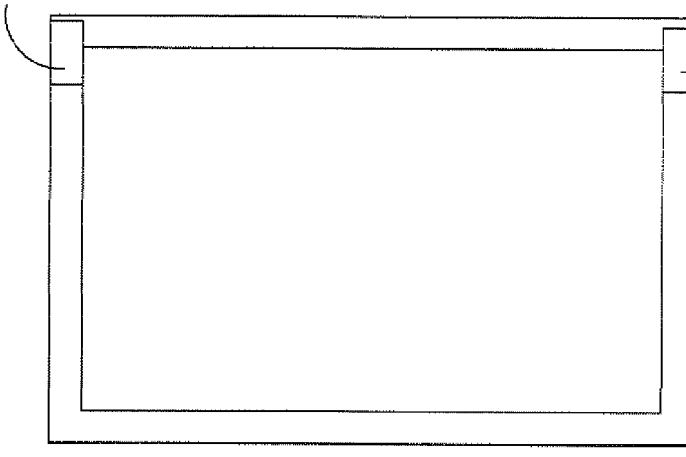
FIG. 9 is a schematic view illustrating SAR values for two antennas of the electronic device.

The method comprises the following steps. In step S01, a known instrument (not shown) is employed to measure SAR for the electronic device 1 so as to obtain a measurement result. In step S02, the number of the antennas 12*a*, 12*b* of the antenna module 12 is increased when the measurement result is not lower than a standard value. In step S03, steps S01 and S02 are repeated until the measurement result is equal to or smaller than the standard value. In this embodiment, the standard value is 1.6 mW/g under the FCC safety standard. In this embodiment, the electronic device 1 is a tablet computer, and the antenna module 12 is disposed inside a housing of the tablet computer that is adjacent to side edges of the housing. Referring to FIG. 8, the SAR value for the tablet computer that has only one antenna 12*a* is 2.5 (mW/g), and is not lower than the standard value 1.6 (mW/g). In this case, as shown in FIG. 9, the number of the antennas of the antenna module 12 is to be increased to two. Preferably, the power density distribution network 13 is a power divider, and distributes transmission power among and the antennas 12a, 12b. Subsequently, the instrument measures the SAR for the antennas 12a, 12b of the electronic device 1, and the measurement results are 0.58 (mW/g) and 0.79 (mW/g), respectively. Since the measurement results of the antennas 12a, 12b are smaller than the standard value, the steps S01 and S02 will not be repeated. Therefore, the SAR for the tablet computer meets the safety requirement established by the FCC.

According to Table 1 below, the SAR for the tablet computer and total radiant power (TRP) of the tablet computer when there is one antenna 12a and there are two antennas 12a, 12b are shown. It can be noted that, the SAP value for the tablet computer is smaller than the standard value when the number of the antennas 12a, 12b is two, whereas the TRP of the tablet computer with the two antennas 12a, 12b is approximate to that of the tablet computer having only one antenna 12a.

TABLE 1

|  | Number of the antennas | |
| --- | --- | --- |
|  | 1 | 2 |
| TRP (dBm) | 22.53 | 22.03 |
| SAR (mW/g) (1 g) | 2.50 | 0.79 |
| SAR (mW/g) (10 g) | 0.85 | 0.30 |

It should be noted that, although two or more antennas are employed in an electronic device to which antenna diversity technology is applied, only one antenna is selected for transceiving signals under the antenna diversity scheme. Hence, the SAR for the electronic device would not be reduced.

In other embodiments, the antenna module 12 is a multiple-input multiple-output (MIMO) antenna module that includes a plurality of communication ports and a plurality of antennas coupled respectively to the communication ports. The method of the present invention can be applied to any one of the communication ports, such that the SAP for the antennas coupled thereto can be reduced.

Figure 3:
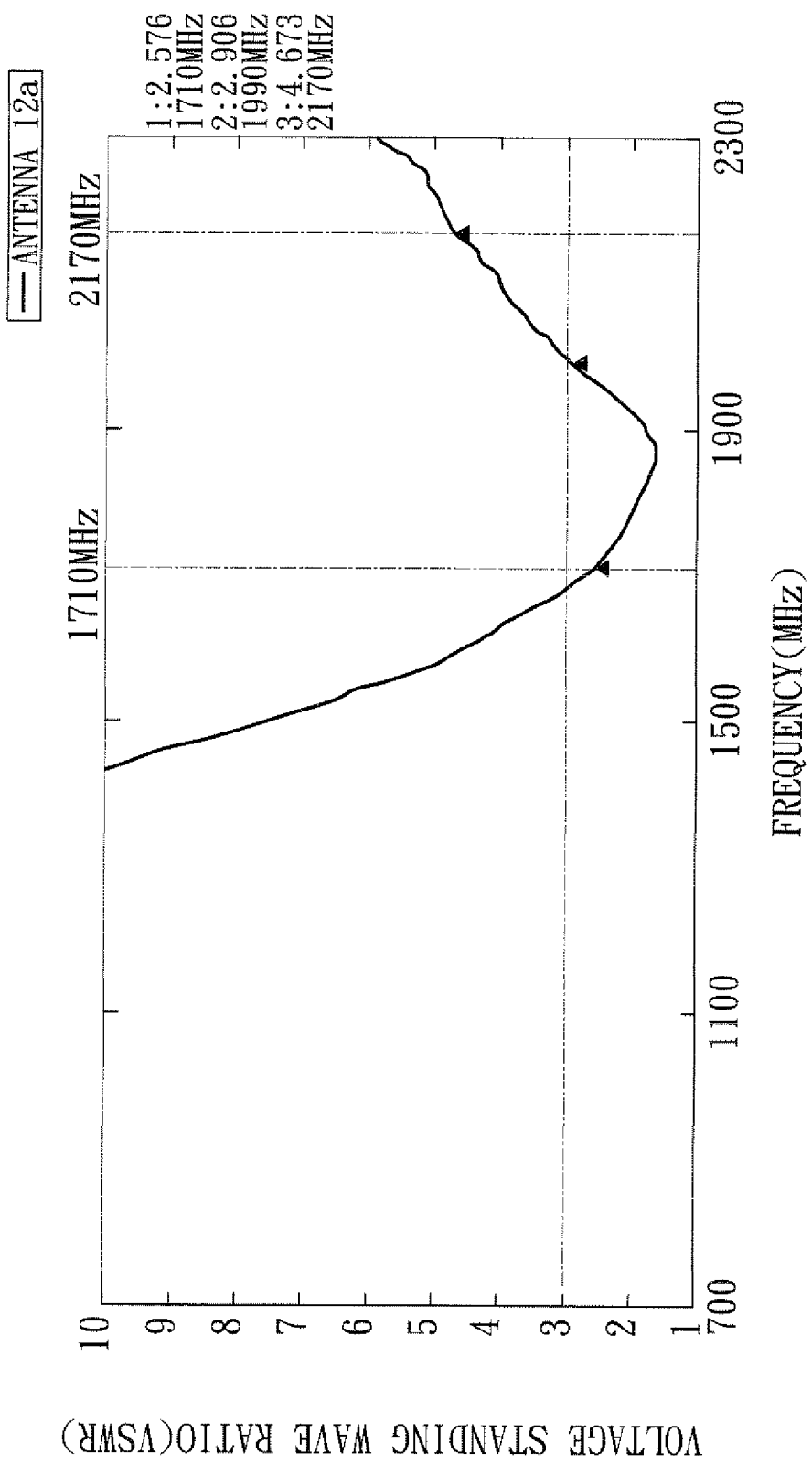
FIG. 3 is a Voltage Standing Wave Ratio (VSWR) plot showing VSWR values of one of the antennas in the electronic device of the preferred embodiment.
Figure 4:
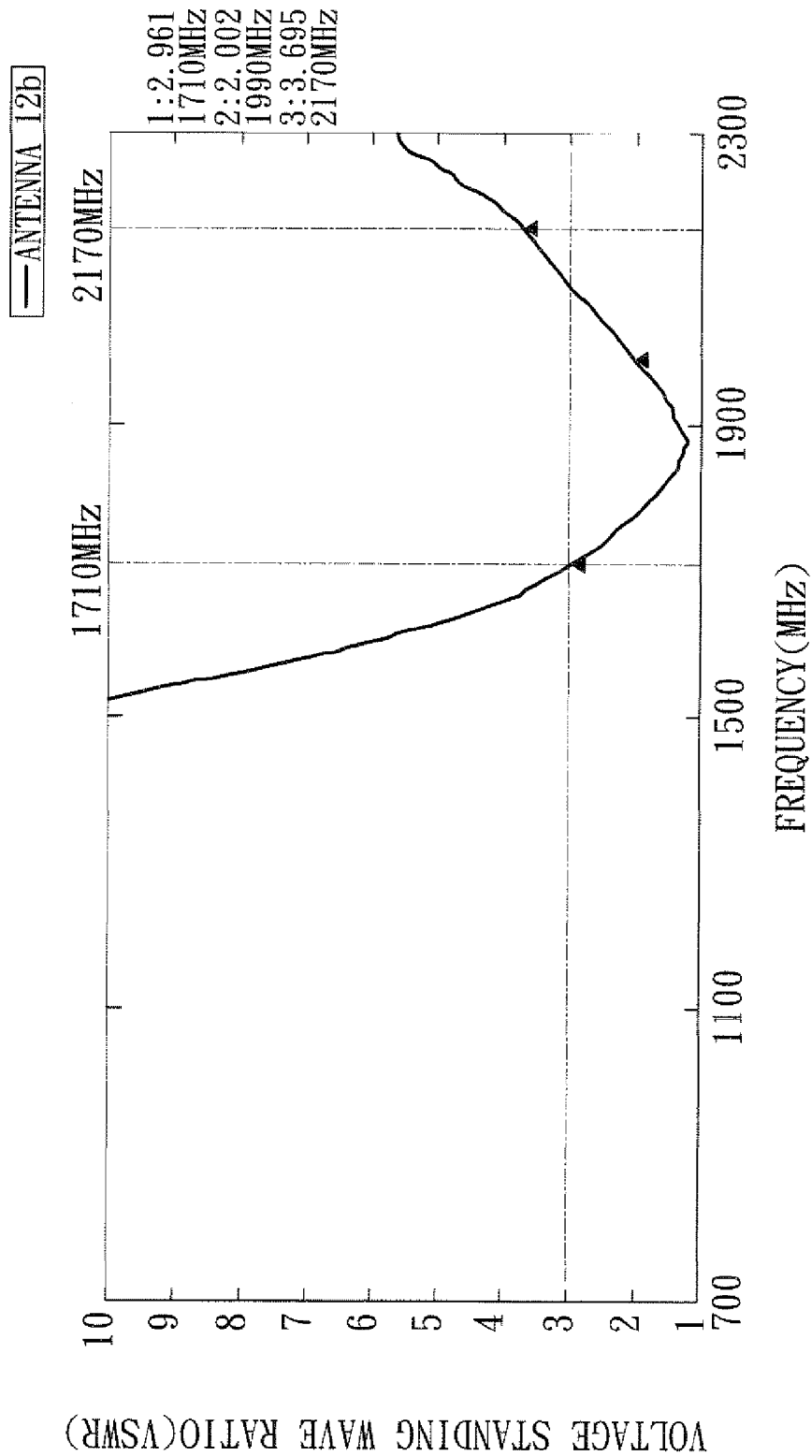
FIG. 4 is a VSWR plot showing VSWR values of the other one of the antennas in the electronic device of the preferred embodiment.

FIGS. 3 and 4 show VSWR values of the antennas 12a, 12b of this embodiment, respectively. It is apparent from these figures that the measured VSWR values of the antennas 12a, 12b operated at frequencies ranging from 1710 MHz~1990 MHz are smaller than 3.

Figure 5:
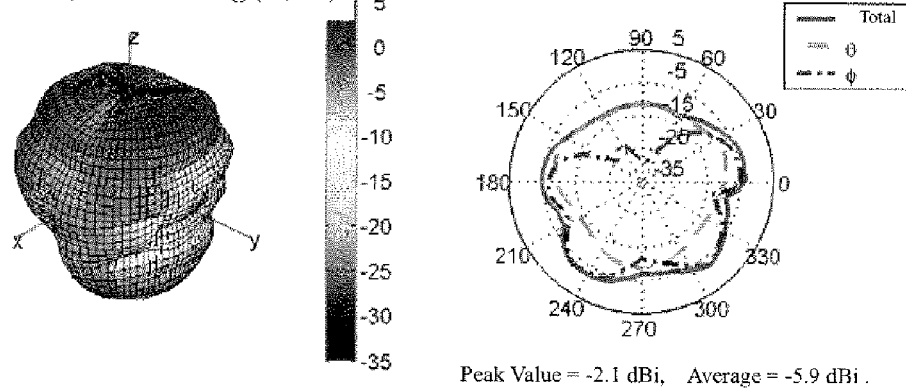
FIG. 5 illustrates radiation patterns of the antenna illustrated in FIG. 3 operating at 1880 MHz.
Figure 5:
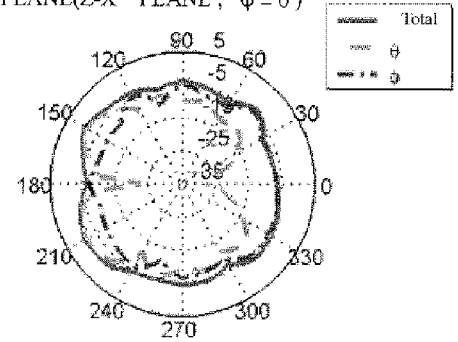
Figure 5:
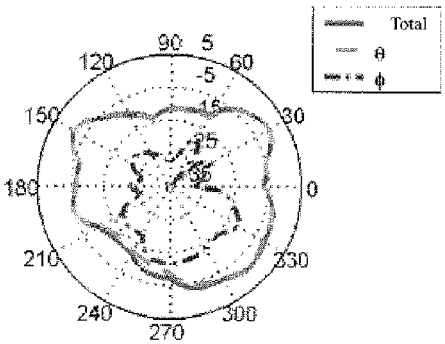
Figure 6:
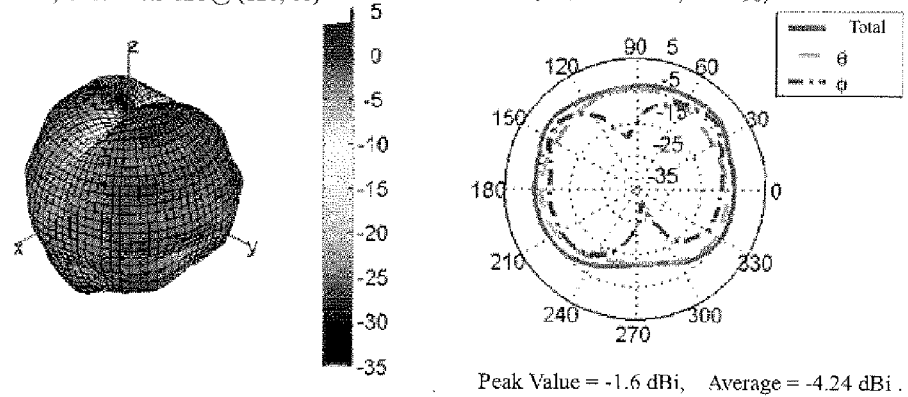
FIG. 6 illustrates radiation patterns of the antenna illustrated in FIG. 4 operating at 1880 MHz.
Figure 6:
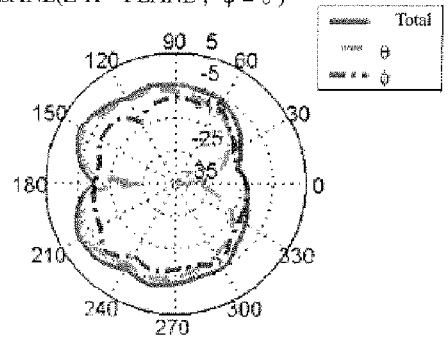
Figure 6:
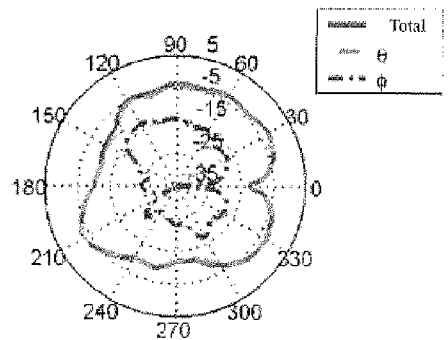
Figure 7:
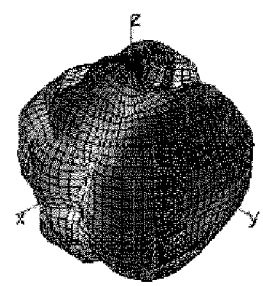
FIG. 7 illustrates effective radiation patterns of the two antennas in the preferred embodiment operating at 1880 MHz.
Figure 7:
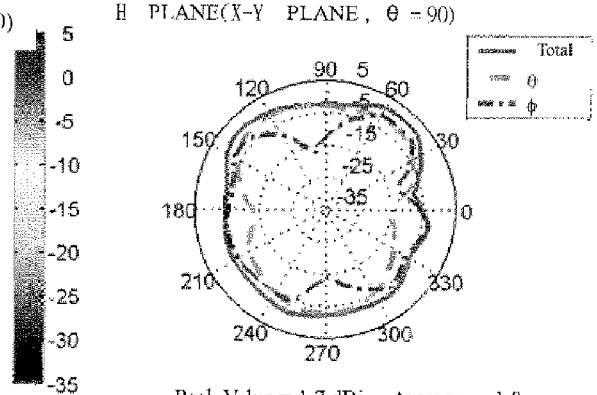
Figure 7:
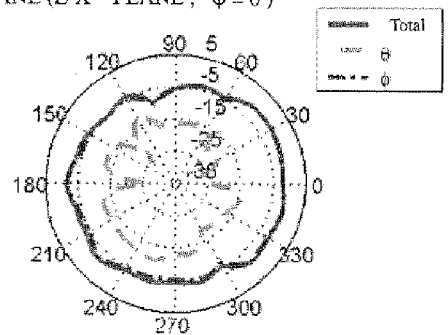
Figure 7:
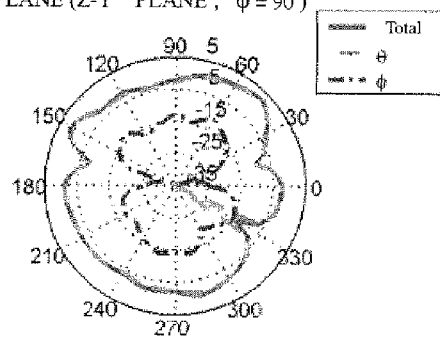

FIGS. 5 to 7 illustrate radiation patterns of the antennas 12a, 12b of this embodiment. It is evident from these figures that the radiation patterns of the antennas 12a, 12b have relatively good omni-directionality. It should be noted that radiation performance of two antennas 12a, 12b is better than that of one antenna 12a, in which the number of null points is decreased.

To sum up, by using the method of the present invention, the number of antennas 12a, 12b that are electrically coupled to the communication port 111 can be increased appropriately, and the power density distribution network 13 distributes transmission power among the antennas 12a, 12b. Therefore, the SAR for the electronic device 1 can be reduced without decreasing efficiency of the electronic device 1.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method of reducing a specific absorption rate (SAR) for an electronic device, the electronic device including a radio frequency module having a communication port, and an antenna module initially having at least one antenna electrically coupled to the communication port, the method comprising the steps of:
    a) measuring the SAR for the electronic device and obtaining a measurement result;
    b) increasing the number of antennas of the antenna module when the measurement result is not lower than a standard value; and
    c) repeating steps a) and b) until the measurement result is equal to or smaller than the standard value.

2. A method of reducing a specific absorption rate (SAR) for an electronic device, the electronic device including a radio frequency module having a communication port, an antenna module initially having at least one antenna electrically coupled to the communication port, and a power density distribution network electrically coupled between the communication port and the at least one antenna, the method comprising the steps of:
    a) measuring the SAR for the electronic device and obtaining a measurement result;
    b) increasing the number of antennas of the antenna module and configuring the power density distribution network for distributing transmission power among the antennas when the measurement result is not lower than a standard value; and
    c) repeating steps a) and b) until the measurement result is equal to or smaller than the standard value.

3. An electronic device comprising:
    a radio frequency module having a communication port;
    an antenna module having a number of antennas electrically coupled to said communication port; and
    a power density distribution network electrically coupled between said communication port and said antennas and configured for distributing transmission power among said antennas such that a specific absorption rate for the electronic device is equal to or smaller than a standard value.

4. The electronic device as claimed in claim 3, wherein said power density distribution network is a power divider.

5. The electronic device as claimed in claim 3, wherein the standard value is 1.6 mW/g.

6. The electronic device as claimed in claim 3, wherein said antenna module is a multiple-input multiple-output (MIMO) antenna module.

* * * * *